(12) United States Patent
Erlebach

(10) Patent No.: US 8,239,974 B2
(45) Date of Patent: Aug. 14, 2012

(54) ELONGATED SHOWER DRAIN

(76) Inventor: Josef Erlebach, Silverthorne, CO (US)

( * ) Notice: Subject to any disclaimer, the term of this patent is extended or adjusted under 35 U.S.C. 154(b) by 625 days.

(21) Appl. No.: 12/345,485

(22) Filed: Dec. 29, 2008

(65) Prior Publication Data

US 2010/0162481 A1 Jul. 1, 2010

(51) Int. Cl.
*E03C 1/26* (2006.01)
(52) U.S. Cl. ............... 4/291; 4/286; 4/290; 4/292
(58) Field of Classification Search .............. 52/741.1; 4/286, 290, 291, 292, 613, 679, 510, 640
See application file for complete search history.

(56) References Cited

U.S. PATENT DOCUMENTS

| | | | |
|---|---|---|---|
| 2,147,044 A | 1/1938 | Lantz | |
| 3,457,568 A | 7/1969 | Amatruda | |
| 4,007,566 A * | 2/1977 | Molitor | 52/169.7 |
| 4,146,939 A * | 4/1979 | Izzi | 4/286 |
| 4,515,498 A * | 5/1985 | Thomann et al. | 404/4 |
| 4,622,911 A | 11/1986 | Salminen | |
| 4,815,888 A * | 3/1989 | Stegmeier | 404/4 |
| 4,883,590 A * | 11/1989 | Papp | 210/164 |
| D312,696 S * | 12/1990 | Phillips | D25/35 |
| 5,281,052 A * | 1/1994 | Beamer | 405/119 |
| 5,340,234 A | 8/1994 | Rossi | |
| 5,372,715 A * | 12/1994 | Maggard et al. | 210/165 |
| 5,454,663 A * | 10/1995 | Stegmeier | 404/2 |
| 5,718,008 A | 2/1998 | Pane | |
| 5,911,518 A | 6/1999 | Jurek | |
| 6,003,169 A * | 12/1999 | Davis, Jr. | 4/613 |
| 6,014,780 A | 1/2000 | Jurek | |
| 6,027,283 A * | 2/2000 | Schweinberg et al. | 405/42 |
| 6,170,095 B1 * | 1/2001 | Zars | 4/507 |
| 6,381,773 B1 | 5/2002 | McAllister | |
| 6,381,775 B1 * | 5/2002 | Sondrup | 4/679 |
| D466,596 S * | 12/2002 | Stegmeier et al. | D23/267 |
| 6,571,406 B2 | 6/2003 | Gerloff | |
| 6,574,937 B1 * | 6/2003 | Rapisarda et al. | 52/630 |
| 6,612,084 B2 * | 9/2003 | Rapisarda et al. | 52/630 |
| 6,612,780 B2 * | 9/2003 | Dahowski et al. | 405/118 |
| 6,618,874 B2 | 9/2003 | Gerloff | |
| 6,687,925 B2 * | 2/2004 | Minnick | 4/613 |
| 6,725,468 B2 * | 4/2004 | Molina | 4/252.1 |
| 6,725,470 B2 | 4/2004 | Webb | |
| 6,941,703 B2 * | 9/2005 | MacLean et al. | 52/34 |
| 7,040,838 B2 * | 5/2006 | Allard et al. | 405/36 |
| 7,066,685 B2 * | 6/2006 | Humphries et al. | 405/43 |
| 7,246,472 B2 * | 7/2007 | Nielsen | 52/302.3 |
| D579,531 S * | 10/2008 | Musser | D23/261 |
| D582,527 S * | 12/2008 | Wang | D23/261 |

(Continued)

*Primary Examiner* — Brian Glessner
*Assistant Examiner* — Joshua Ihezie
(74) *Attorney, Agent, or Firm* — Leyendecker & Lemire; Kurt Leyendecker

(57) ABSTRACT

Elongated drain assemblies suitable for use in tiled shower stalls are described. Because the elongated drain is typically located at one edge of the shower stall proximate a stall wall and extends substantially the entire length of the wall, the installation of the associated shower pan is made much simpler. Specifically, the pan need only be sloped substantially in a single direction instead of four towards a prior art circular drain located at the center of a stall. The time and cost of creating a pan having a single slope is reduced over a more complex multi-sloped pan. Several different means for adjusting the height of the drain assemblies' top surfaces relative to the height of the tile floor are provided to adjust for tile floors of differing thicknesses.

11 Claims, 13 Drawing Sheets

U.S. PATENT DOCUMENTS

| | | | |
|---|---|---|---|
| 7,617,644 B2* | 11/2009 | Nielsen | 52/302.3 |
| 7,637,694 B1* | 12/2009 | Musser | 405/118 |
| 7,735,512 B1* | 6/2010 | Ismert et al. | 137/362 |
| 7,748,170 B1* | 7/2010 | Pratt | 52/11 |
| 7,794,176 B2* | 9/2010 | Musser | 405/118 |
| 7,964,095 B1* | 6/2011 | Graybeal | 210/164 |
| 7,967,523 B2* | 6/2011 | Hetzler et al. | 404/4 |
| 2002/0066140 A1 | 6/2002 | Gerloff | |
| 2002/0148039 A1* | 10/2002 | Minnick | 4/613 |
| 2005/0223485 A1* | 10/2005 | Nijhof | 4/613 |
| 2008/0017562 A1* | 1/2008 | Tripodi et al. | 210/163 |
| 2008/0104910 A1* | 5/2008 | Andras et al. | 52/302.3 |
| 2008/0163419 A1* | 7/2008 | Nishi | 4/613 |
| 2009/0097921 A1* | 4/2009 | Hetzler et al. | 405/119 |
| 2009/0241440 A1* | 10/2009 | Musser | 52/169.5 |
| 2011/0067175 A1* | 3/2011 | Steylaerts et al. | 4/679 |

* cited by examiner

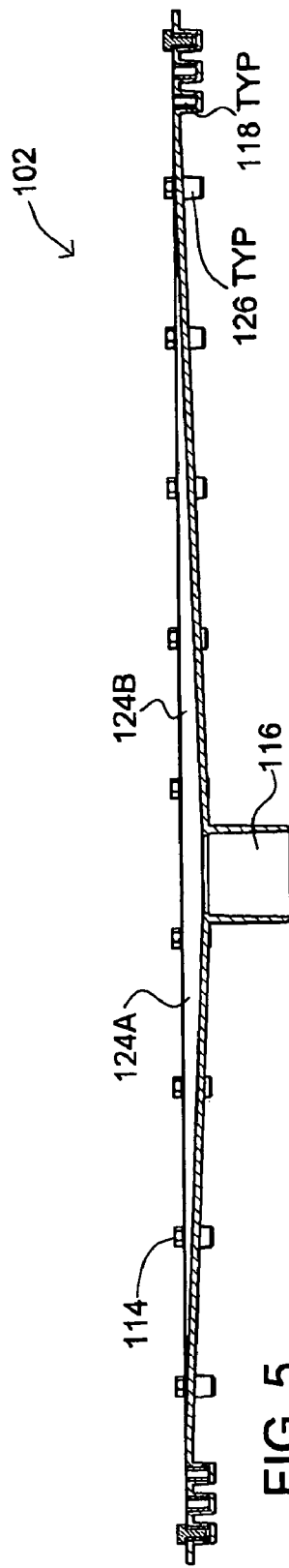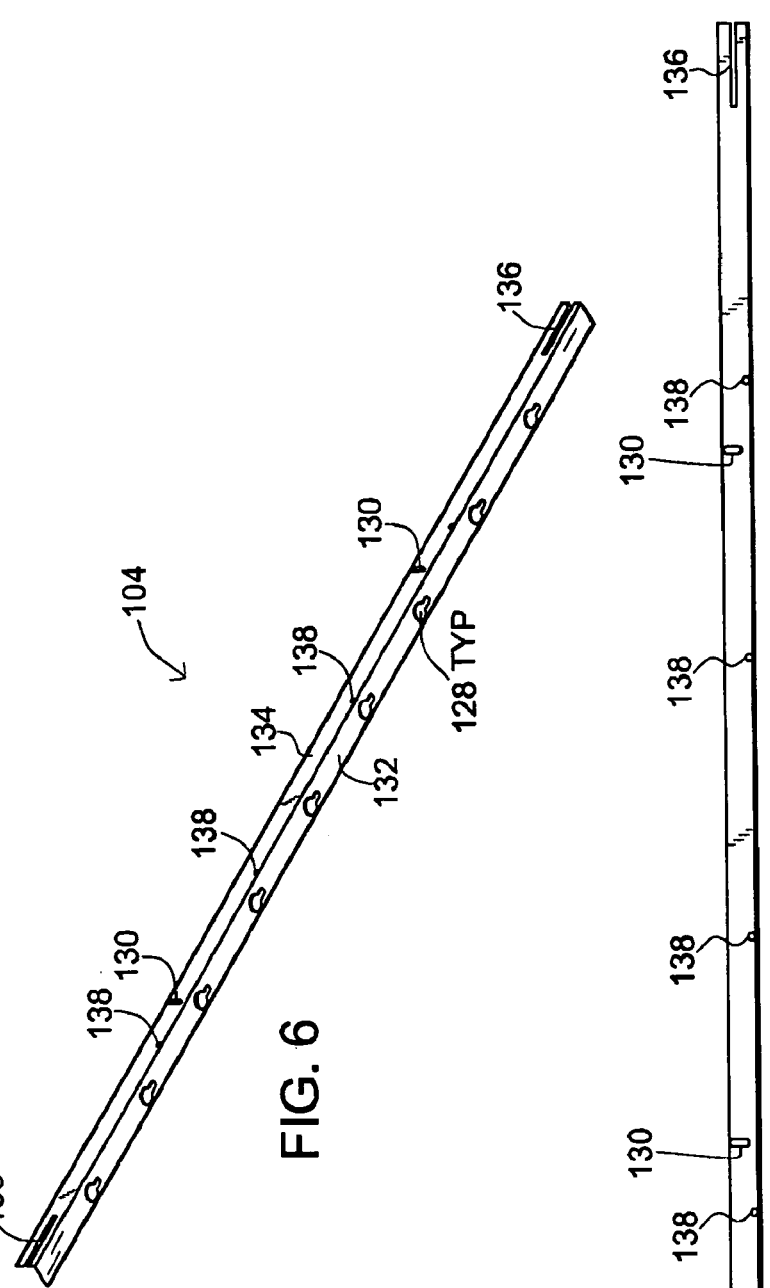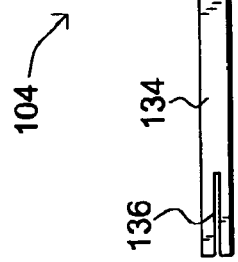

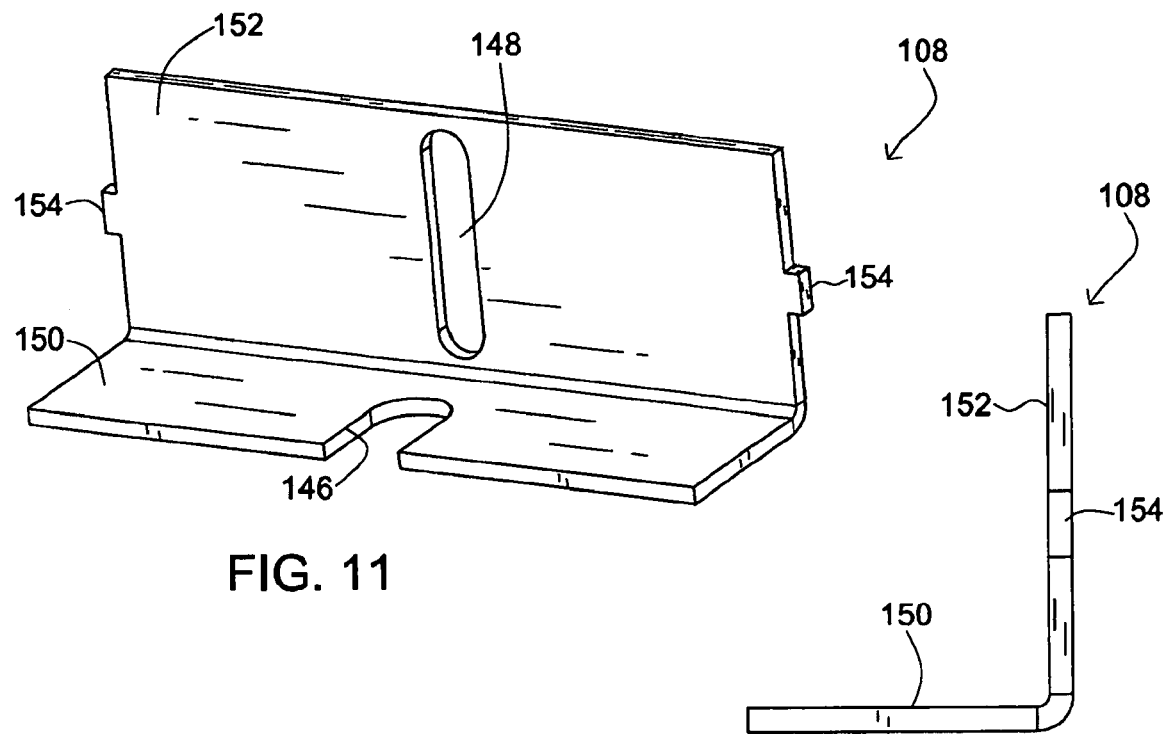
FIG. 11
FIG. 12
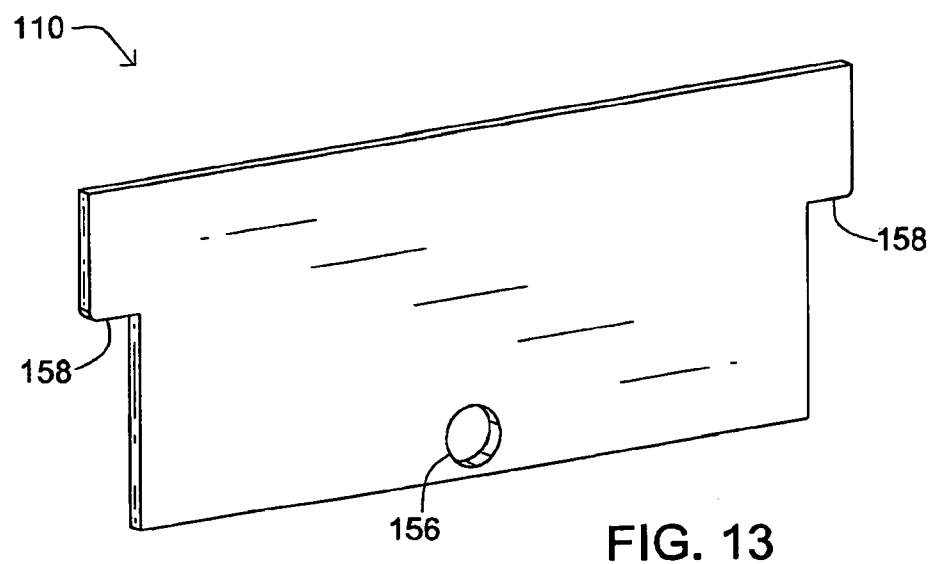
FIG. 13

ELONGATED SHOWER DRAIN

FIELD OF THE INVENTION

The present invention pertains to floor drains such as those typically found in residential and commercial showers.

BACKGROUND

Bathrooms and showers stalls are often provided with tiled floors especially in higher end homes. In shower stalls, a drain is typically placed in or near the center of the stall and the floor is sloped slightly towards the center drain to ensure the water runs into the drain as opposed to sitting on the floor or seeping into the structure at the intersection of the floor with the stall walls.

As can be appreciated, tiling a floor that slopes in different directions towards the center of the stall can be difficult and time consuming especially if localized reversed slopes and other slope anomalies are to be avoided. The problem can be especially acute when large-sized tiles (6"×6", 8"×8", 12"×12" and larger) are utilized. Often it is necessary to cut the tiles on a diagonal where two slopes running in different directions intersect.

Elongated drains that are located a one edge of a stall thereby facilitating a floor that slopes primarily in a single direction are known. However, they tend to be best suited for commercial or industrial applications and often require installation by skilled craftsmen to ensure the drain's top surface is effectively even or level with that of the surrounding floor. For instance in many commercial applications like in communal showers, elongated drains are molded into the concrete pans of the expansive floors and are covered with perforated grates. The sides and bottom surfaces of these molded-in drains are then often covered in tiles. Such exacting and time consuming construction make these drains economically unsuitable for use in most residential structures.

Cost-effective prefabricated elongated drains suitable for use in residential structures are just not readily available in the marketplace. Elongated drain assemblies that have been proposed are often not amenable for use by do it yourselfers, who are mechanically astute but lack the experience of tradesmen. Furthermore, prior art assemblies even if amenable for installation by tradesmen are either or both prohibitively expensive and prohibitively expensive to install. These cost considerations ameliorate any potential cost advantages of installing a titled shower with a pan that is sloped in a single direction instead of multiple directions.

BRIEF DESCRIPTION OF THE DRAWINGS

FIG. 5 is cross sectional side view of the drain base unit according to one embodiment of the present invention.

FIG. 6 is an isometric view of the lower long rail according to one embodiment of the present invention.

FIG. 7 is a side view of the lower long rail of FIG. 6 according to one embodiment of the present invention.

FIG. 11 is an isometric view of the lower short rail according to one embodiment of the present invention.

FIG. 12 is an end view of the lower short rail of FIG. 11 according to one embodiment of the present invention.

FIG. 13 is an isometric view of the upper short rail according to one embodiment of the present invention.

DETAILED DESCRIPTION

Figure 1:
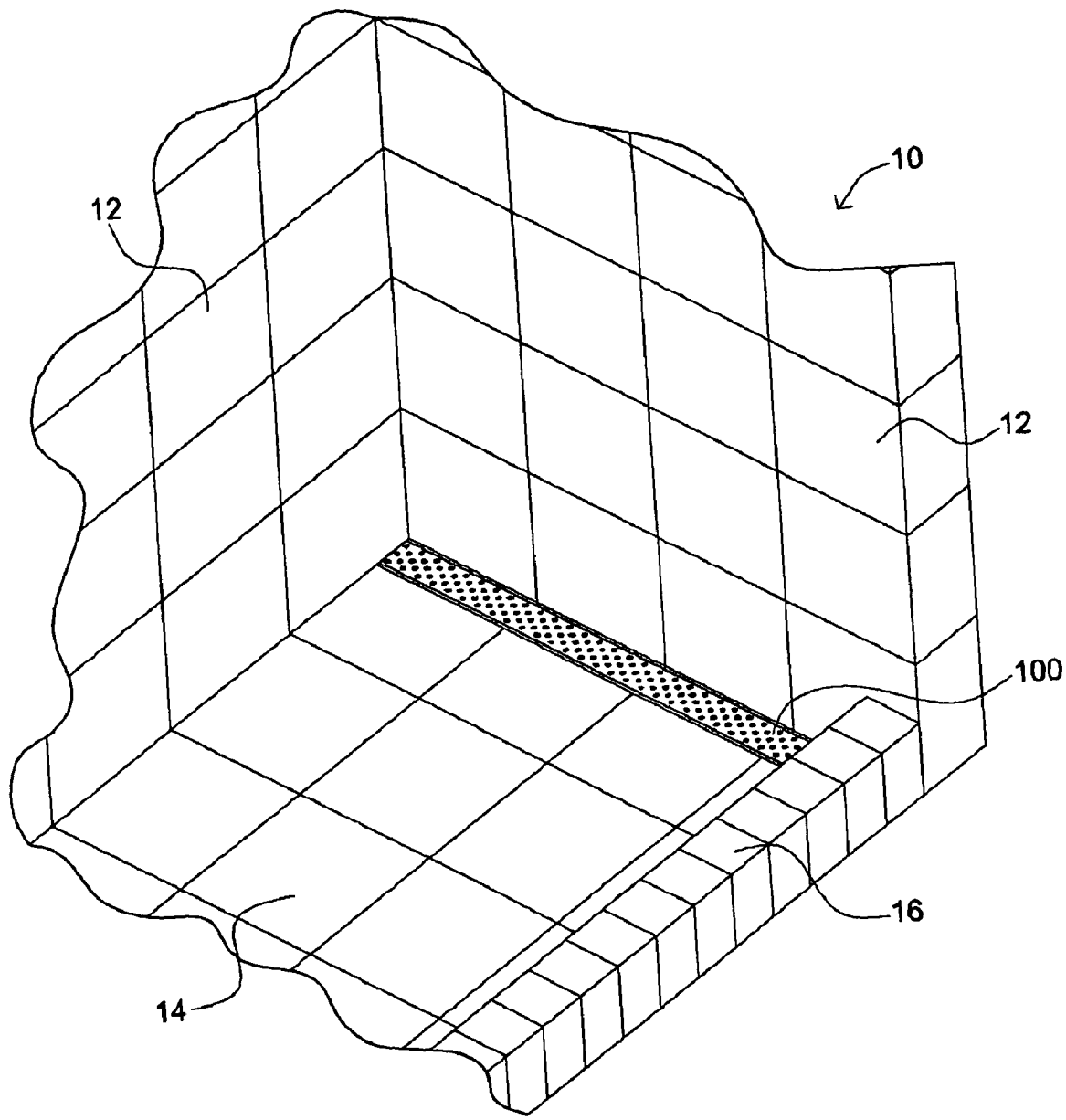
FIG. 1 is an isometric view of a shower stall having an elongated drain installed therein according to one embodiment of the present invention.

Embodiments of the present invention comprise elongated drain assemblies suited for use in residential construction. Because the elongated drain is typically located at one edge of the shower stall proximate a stall wall and extends substantially the entire length of the wall, the installation of the associated shower pan is made much simpler. Specifically, the pan need only be sloped substantially in a single direction instead of four towards a circular drain located at the center of a stall. The time and cost of creating a pan having a single slope is reduced over a more complex multi-sloped pan.

The use of an elongated drain is especially advantageous in shower stalls wherein the floor is finished with larger tiles (6"×6" to 24"×24"). With traditional center drain floors, the use of large tiles is often not possible depending on how the pan is sloped. Even when properly sloped; the tile layer typically has to cut a large number of the tiles on the diagonal to account for the intersection of differently sloped portions of the pan. As can be appreciated the increased complexity of the tiling laying job increases, often substantially, the cost of tiling the shower pan. However, since the pan slopes in substantially a single direction when an elongated drain is used, no special or complex tile work is required; thereby, substantially decreasing the cost of laying the tile.

One of the primary considerations in laying a shower stall pan and subsequently the tile over the pan is ensuring that the top of the drain is essentially level with the immediately adjacent tile. If the top of the drain is depressed too far, an edge is created in which a user of the shower could stub his/her toe or otherwise injure his/her foot. If the top of the drain is too high, a puddle of standing water might fill a portion of the pan. The water may not evaporate between shower uses and as such promote the growth of mold and bacteria.

The traditional round drain typically includes a top portion that includes the top of the drain including a grate and a bottom portion that attaches to the drain pipe. The top portion is typically threadably received into the bottom portion such that by rotating the top portion its relative height can be adjusted upwardly and downwardly. The skilled shower pan fabricator and tile layer know within a small margin of error the relative height built up from the subfloor for the pan and the tiles including the necessary thickness of thin-set mortar layers.

Prior art elongated drains do not have a convenient mechanism or means to adjust the relative heights of the top of the grate and as such the installer must design the pan and tile thicknesses to accommodate the drain rather than the drain accommodating the particular combination of pan and tile. This can be especially problematic when tiles of a thickness other than that for which the prior art drain is designed are used. For instance, a drain may be designed to accommodate a pan of standard thickness in combination with a predetermined thin-set thickness and a predetermined standard tile thickness. If the installer desires to use thinner tile or thicker tile, such as is common with some natural stones, the grate will fall rise above or fall below the top of the grate potentially resulting in similar problems as discussed above concerning circular drains in addition to detracting from the aesthetics of the shower stall floor.

One embodiment of the present invention provides one means to adjust the height, or spacing, of the top of the drain grate relative to a base unit prior to the installation of tile by rising or lowering side and end plates and securing them in place. The means of another embodiment permits the height of the grate to be adjusted through the use of grate attachment spacers after the pan and the tile have been installed.

The size of shower stalls can vary dramatically. However, for maximum effectiveness the elongated drain should span most of one side of the shower stall. If the drain is shorter than the length of the side, the tile on either side of the drains ends will have to be sloped towards the drain thereby increasing the complexity of the installation somewhat. Certain embodiments are produced in standard lengths that correspond to common shower stall wall lengths. When these embodiments are utilized the length of the wall must be carefully determined often at a framing stage of construction.

Often there isn't an opportunity to design a shower stall around the drain. For instance, the shower stall's framing may be substantially complete before the installation of an elongated drain is considered. In other circumstances, the installation of the elongated drain may be part of a remodel using existing framing. In such circumstances, standard length drains might not span the entire length of a side and as such require sloping of the pan and tiles proximate one or both ends of the drain.

In at least one embodiment of the present invention, the length of the drain is adjustable approximately 1.5 inches on either side. For example, a single drain unit can be used along a shower wall measuring 34.5" as well as a shower wall measuring 37.5". Accordingly, the number of variations of the embodiment that have to be produced for a variety of size shower stalls is reduced. The adjustability of the length permits the installer to accommodate shower stalls that are slightly too large or too small relative to their plan dimensions.

Terminology

The terms and phrases as indicated in quotes (" ") in this section are intended to have the meaning ascribed to them in this Terminology section applied to them throughout this document including the claims unless clearly indicated otherwise in context. Further, as applicable, the stated definitions are to apply, regardless of the word or phrase's case, to the singular and plural variations of the defined word or phrase. The term "or" as used in this specification and the appended claims is not meant to be exclusive rather the term is inclusive meaning "either or both".

References in the specification to "one embodiment", "an embodiment", "a preferred embodiment", "an alternative embodiment" and similar phrases mean that a particular feature, structure, or characteristic described in connection with the embodiment is included in at least an embodiment of the invention. The appearances of the phrase "in one embodiment" in various places in the specification are not necessarily all meant to refer to the same embodiment.

The term "coupled" or "coupled" as used in this specification and the appended claims refers to either an indirect or direct connection between the identified elements, components or objects. Often the manner of the coupling will be related specifically to the manner in which the two coupled elements interact.

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiments and are not necessarily intended to be construed as limiting.

As applicable, the terms "about" or "generally" as used herein unless otherwise indicated means a margin of +−20%. Also, as applicable, the term "substantially" as used herein unless otherwise indicated means a margin of +−10%. Concerning angular measurements, "about" or "generally" refers to +−10 degrees and "substantially" refers to +−5.0 degrees unless otherwise indicated. It is to be appreciated that not all uses of the above terms are quantifiable such that the referenced ranges can be applied.

A Shower Stall Incorporating an Elongated Shower Drain

FIG. 1 is an illustration of a tiled shower stall 10 showing an elongated drain 100 extending substantially the entire length of the floor 14 proximate an intersection with an adjacent wall 12. Also shown in the figure is a raised tiled curb 16 along a front side of the stall. In many installations, a shower door can be stalled above the curb to fully enclose the stall. In yet other installations where the shower head is located a sufficient distance from the curb, a door may be unnecessary. Although not readily evident from the illustration, the tile floor 14 slopes gently towards the drain in substantially a single direction. Most codes in the United States require a slope of about 0.25 inches of drop for every 12 inches of floor run or stated another way a 2% slope.

There are several types of shower pans utilized in residential and commercial construction. Perhaps the most common type of pan is a molded one piece pan comprised of a polymeric resin that may be reinforced with fiberglass or another suitable material. These factory produced pans are typically provided with center drain holes and may even include a drain preinstalled therein. These prefabricated pans are typically not designed to receive tile over them and are most often used in lower to middle level residential construction. These types of pans are often not amenable to custom construction given the small number of sizes in which they are produced.

The various embodiments of the elongated drain are configured for use primarily with formed in place shower stall floors and pans as are typically used in high end residential construction. It is to be appreciated, however, that variations of the embodiments described herein can be configured for use with preformed pans.

There are numerous shower floor systems that can be utilized in a custom shower stall construction that are designed to receive tile flooring thereon. Traditionally, a bottom piece of a drain is secured to the drain pipe and secured to the subfloor. A layer of tar paper or other barrier material may be secured over the subfloor in some installations. Next, a pre-pan is fabricated using a dry pack concrete material on top of the shower stall's subfloor. The material is packed in place and leveled. After the pre-pan has cured, a waterproof liner membrane is secured in place over the top of the pre-pan. An opening only slightly larger than the drain's opening is cut in the membrane and an top drain piece is bolted to a flanged portion of the drain's bottom piece typically through bolt holes made in the membrane such that the top and bottom drain pieces sandwich the membrane as is extends around the drain opening. Next, an inner pan also comprised of dry pack is packed in place over the membrane. The inner pan is sloped and contoured as necessary. Before the dry pack has cured and often before the dry pack is placed over the membrane in some embodiments, the height of a prior art round drain's top is adjusted and set taking into account both the thickness of the inner pan, tiles and a thin-set mortar layer used to bond the tiles. Finally, once the inner pan has cured, the desired tiles are secured in place using a thin set or other suitable mortar mix.

Figure 17:
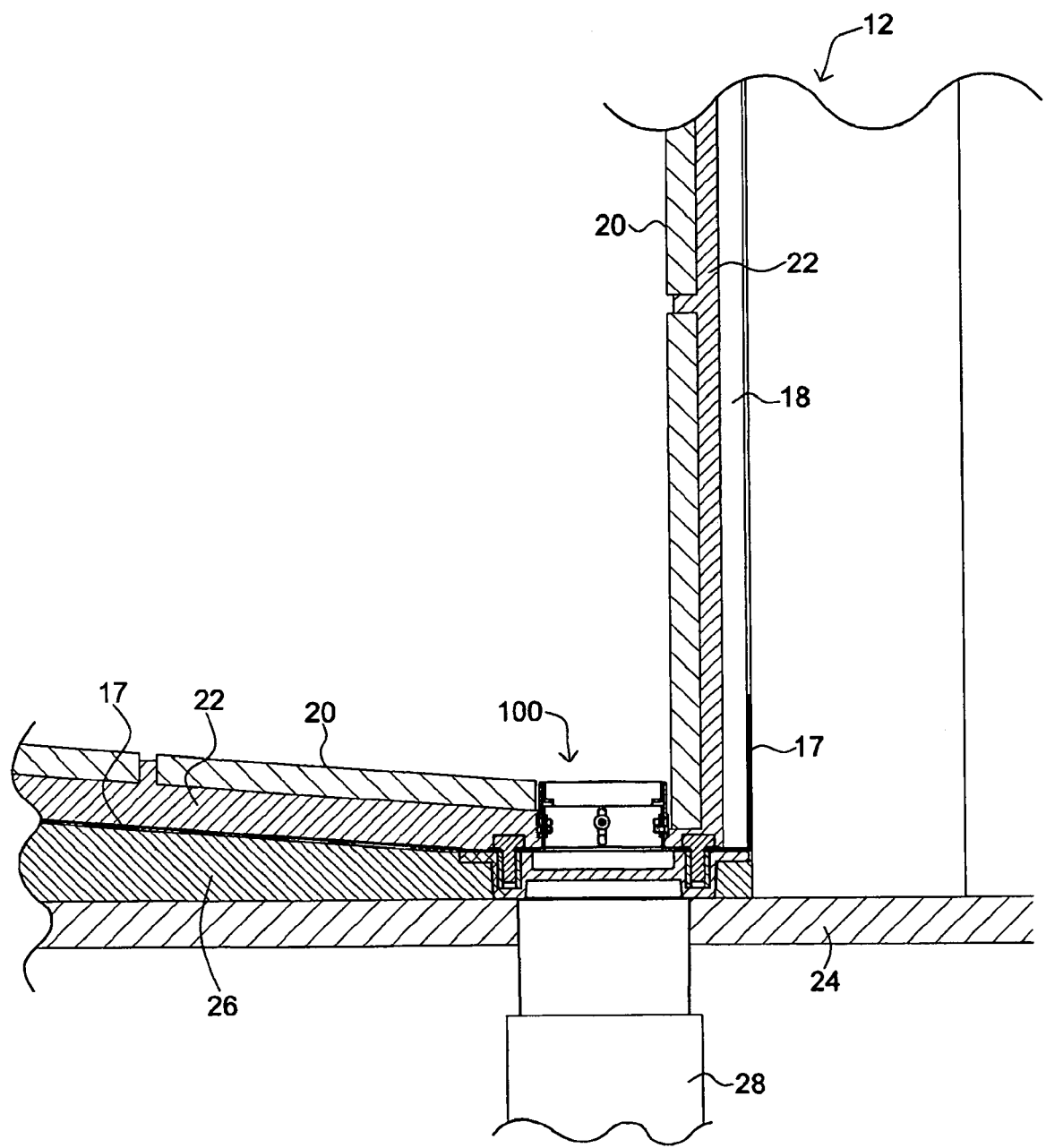
FIG. 17 is a cross sectional view of the elongated drain assembly installed in a shower stall according to one embodiment of the present invention.

Shower pans systems that do away with the inner pan have become popular. FIG. 17 provides an illustration of a cross section of this type of shower pan/floor configuration 14 as adapted for one embodiment of the present invention. The pre-pan 26 is constructed on top of the subfloor 24 in a manner similar to that described above except the pre-pan is sloped and contoured as necessary. Next, a specially configured waterproof membrane 17 that has an upwardly facing surface adapted to bond to thin set mortar is received over the pre-pan. The membrane is adhesively secured to the pre-pan substantially over the entirety of its downwardly facing surface. One suitable membrane material is NobleSeal TS produced by the Noble Company of Grand Haven, Mich. The membrane comprises a chlorinated polyethylene sheet with non-woven polyester laminated to both sides to facilitate adhesion of adhesives and thin-set thereto. NobleBond EXT adhesive also from Noble Company can be used to bond the membrane to the pre-pan. Next, thin set mortar 22 can be applied directly to the membrane and tile 20 set on top of it Like above, the membrane is sandwiched between bottom and top pieces of the drain. The height of the drain is set prior to setting the tiles in place.

A First Embodiment Elongated Shower Drain Assembly

A first embodiment elongated shower drain assembly 100 is illustrated in FIGS. 2, 3, 15, 16 & 17 with the various individual components of the assembly being illustrated in FIGS. 4-14. The first embodiment assembly essentially comprises: (i) a base unit 102 that rests on the shower stall subfloor 24 and is coupled with a drain pipe 28; (ii) front and back long rail assemblies 104 & 106 that form front and back longitudinally-extending sidewalls; (iii) left and right short rail assemblies 108 & 110 that form left and right laterally-extending sidewalls; (iv) a grate 160 and (v) various fasteners 112 & 114 to join and secure the drain assembly together.

Figure 4:
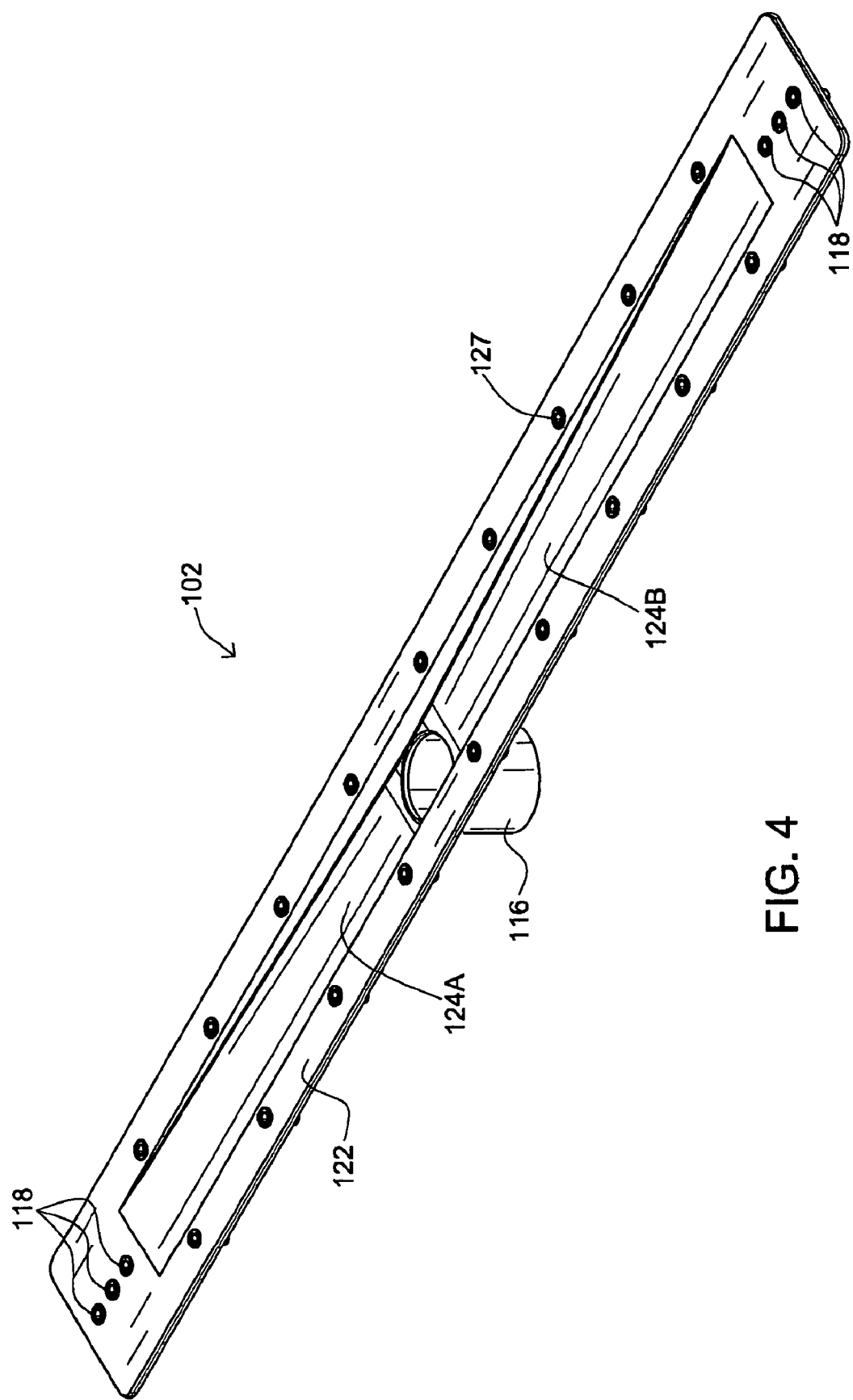
FIG. 4 is an isometric view of the drain base unit according to one embodiment of the present invention.

Referring primarily to FIGS. 4 & 5, the base unit 102 is illustrated. It is typically injection molded in ABS or PVC plastic to comply with different code requirements in the various states. The unit can be produced in a variety of different lengths to accommodate shower stalls of differing sizes. However, as indicated above the length of the base unit is adjustable to accommodate using a single unit for a range of differently sized shower stalls. For instance in one variation, the unit is about 39.4" in length but by selectively trimming its length on either or both ends, the unit can be used against shower stall walls varying from just under 36" to 39.4" in length. This feature is described in greater detail below. The width of the unit is typically about 4.3" although this can change on variations.

The base unit 102 forms a trough 124 that comprises left and right bottom portions 124A & 124B that slope gently towards a drain pipe connector 116, also referred to herein as a discharge opening, located generally proximate the center of the unit although the location can vary substantially so long as the respective left and right portions are suitably sloped towards the connector. The width of the trough is dictated largely by the diameter of the pipe connector which in turn is dictated by the diameter of the drain pipe. As per code in most states and locales, a 2" diameter shower drain pipe is required and as such the inside diameter of the connector and the width of the trough is typically slightly greater than 2".

Because of the slope, the depth of the trough 124 relative to the top surface of the unit 102 varies from zero at the respective left and right ends to its greatest depth at the pipe connector 116. The depth of the trough is largely dictated by the overall thickness of the base unit which in turn is determined at least in part by the configuration of the drain pipe within the confined depth provided by floor joists. In one variation, the overall thickness of the unit is about 2.75" from the bottom of the connector to the top surface and maximum depth of the trough is about 0.70".

A flange 122 surrounds the trough. In one variation, the flange is about 0.75" wide proximate the front and back elongated sides of the unit and about 3" wide proximate the shorter left and right ends. As hinted at above and described below the end flanges are subject to trimming to fit the unit in shower stalls with walls of different lengths. The thickness of the flange is about 0.160" except for the material comprising the various threaded bosses which is about 0.70" thick. The top surface of the flange is substantially flat and in use a waterproof membrane is received over it. The various rail assemblies are then placed on top of the membrane and coupled to the base unit by way of threaded fasteners 112 thereby sandwiching and sealing the membrane to prevent water from seeping underneath the membrane and on to the pre-pan and possibly the subfloor.

A variety of threaded bosses 118 & 126 are provided on the flange 122. The bosses comprise threaded brass 127 inserts that are molded in situ. In one variation, there are nine bosses distributed along each of the front and back flange portions and three longitudinally aligned bosses on each of the left and right end flange portions. The bosses are adapted to receive ¼" hex head bolts 112 therein. As can best be seen in FIG. 5, the bottoms of the bosses extend downwardly beyond the bottom of the flange. As such, it is the bottoms of the bosses that are typically in contact with the surface of the subfloor when the unit is secured to the drain pipe.

As noted above, the left and right ends include three longitudinally aligned bosses 118. However when attaching the left and right short rail assemblies to the base unit, only a single bolt 112 and associated boss are utilized. It is appreciated that the length of the left and right flanges are cut to adjust the length of the base unit for shower stall walls of differing lengths. The two outermost remaining bosses are then used to secure the short rail assemblies. If a boss to the inside of the utilized boss remains, it can be filled with adhesive as desired or left as is since the bottom of the boss is enclosed and only a small and generally insignificant volume of water will fill the cavity during use.

To install the base unit 102, its location on the subfloor 24 typically immediately adjacent a shower stall wall 12 is determined. It is to be appreciated that the drain 100 can be installed in other locations even spanning the shower stall floor; however, in most circumstances installing the drain at an edge of the pan is both easier and more cost effective as well as the most aesthetically pleasing. As an initial matter, the necessary and desired location of the drain pipe 28 in the shower stall is determined and the plumbing is suitably configured. A small hole is made in the subfloor to provide access to the end of the pipe.

The pipe connector 116 is then adhesively bonded or solvent fused to the end of the drain pipe 28 such that the drain effectively rests flat on the subfloor 24 in a desired orientation with primarily the bottom ends of the bosses being in contact with the subfloor. Next, the pre-pan 26 is constructed. In a system that does not use an inner pan, such as is illustrated in FIG. 17, the pre-pan is sloped about 0.25" for every foot in a single direction towards the drain. The dry pack concrete can be packed underneath the base unit filling some if not all the space between the bosses to better fix and secure the drain in place, although this is not necessary in all circumstances for a successful installation.

After the pre-pan 26 has cured, the waterproof membrane 17 is fit in place. In the case of a system wherein an inner pan will be constructed, the membrane is typically laid over the subfloor and secured on the stall walls several inches above the pre-pan. Where the membrane is type that eschews the need for an inner pan, the membrane is adhesively bonded to the pre-pan and optionally to the top of the flange 122 on the base unit 102. Furthermore, the membrane is typically folded and run the walls 12 of the stall to create a waterproof basin. As shown in FIG. 17, the membrane is located directly against the studs and drywall or backer board 18 is secured over the membrane. It is to be understood that the membrane can be attached over the drywall as well to protect the drywall material from water infiltration.

Next, holes are made through the membrane coincident with the threaded bosses in the base unit and hex-head bolts 112 are passed therethrough and threadably received in the bosses 118 & 126 although not fully tightened therein. Additionally, a rectangular piece of membrane located directly above the trough 124 can be cut away to reveal the trough at this point or the membrane can be cut at a later stage of installation after the rail assemblies are installed.

Figure 2:
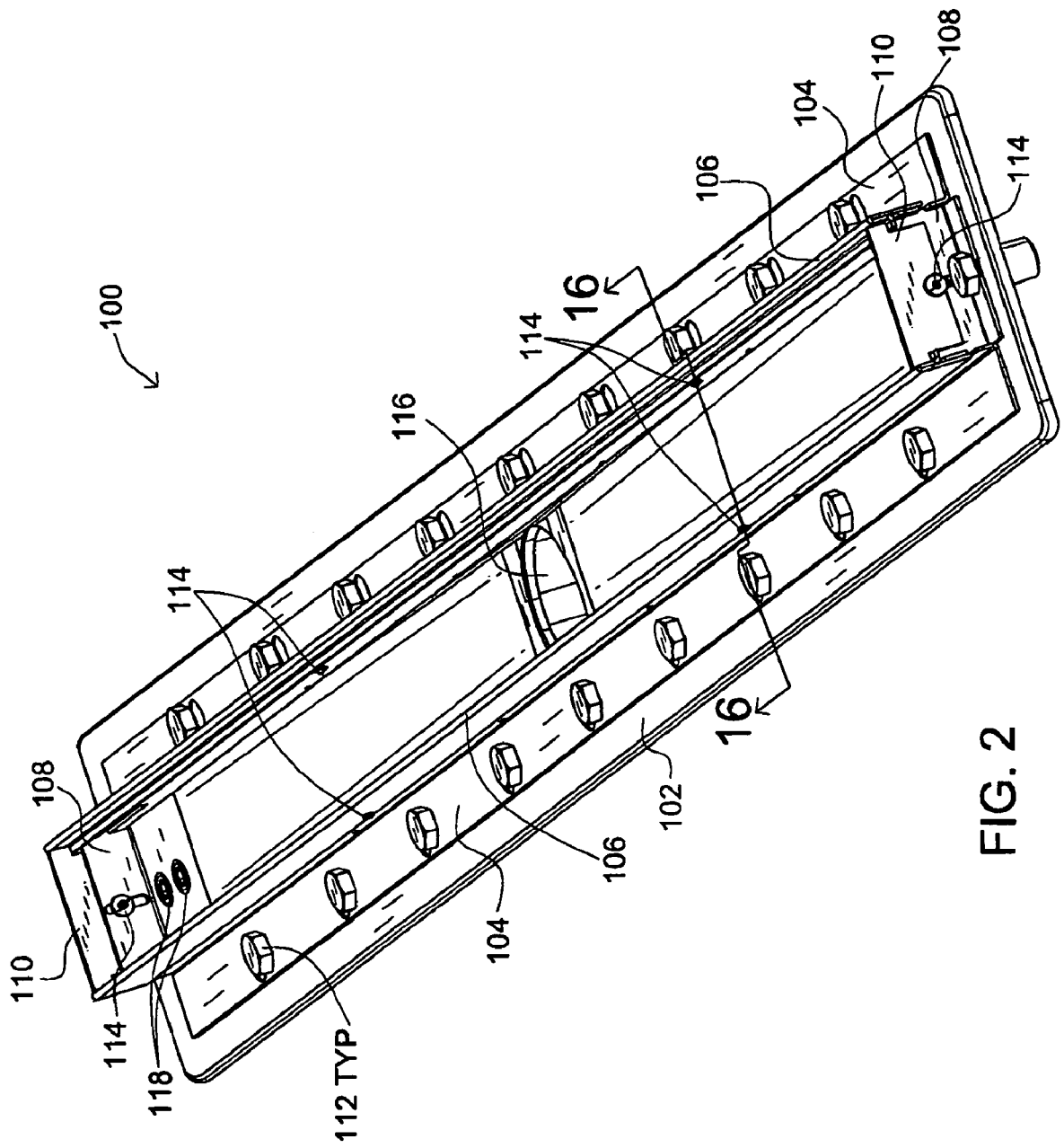
FIG. 2 is an isometric view of the elongated drain assembly according to one embodiment of the present invention.
Figure 3:
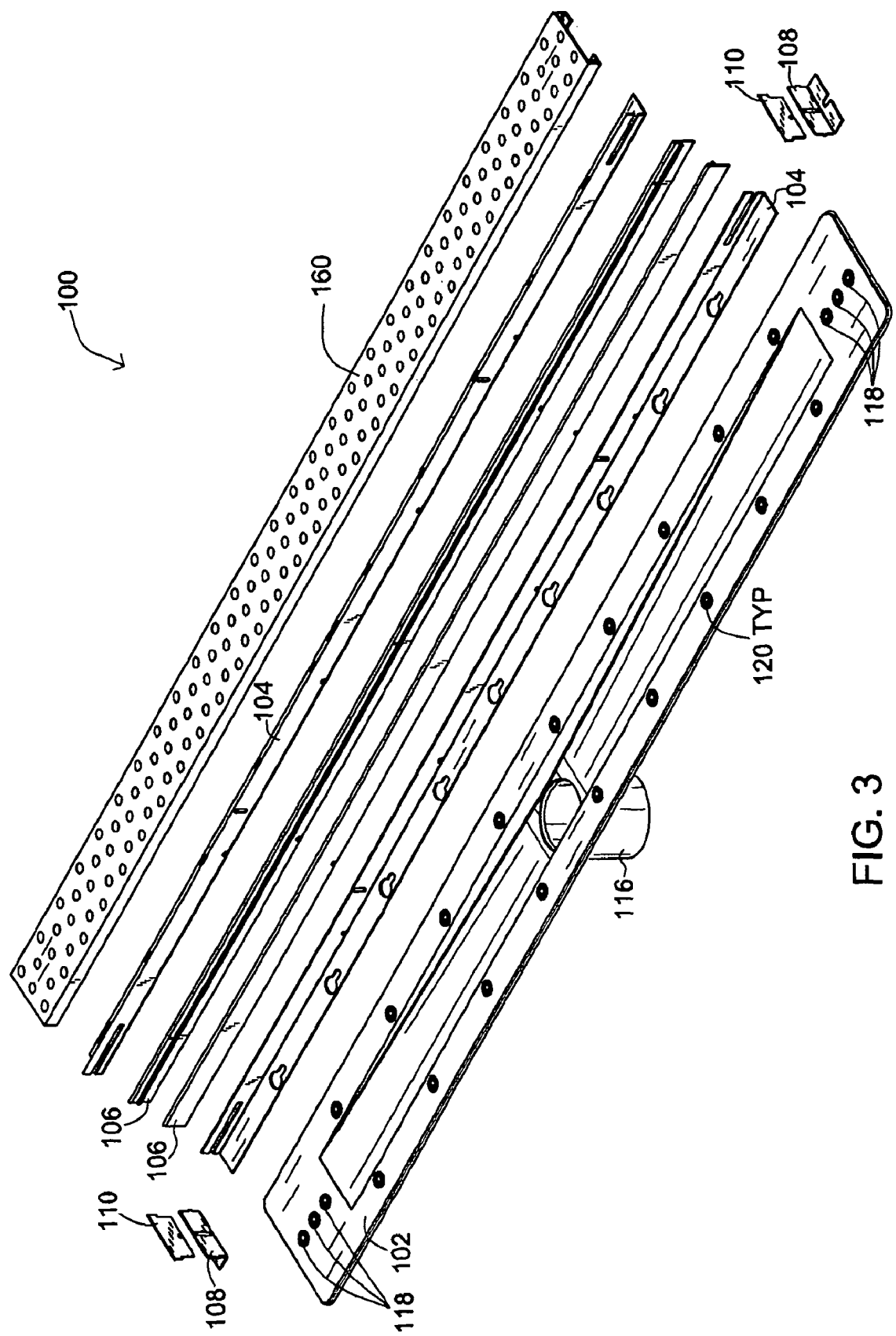
FIG. 3 is an exploded isometric view of the elongated drain assembly of FIG. 2 according to one embodiment of the present invention.

Referring primarily to FIG. 2, the front and back rail assemblies each comprise in combination a lower long rail 104, an upper long rail 106 and associated socket head adjustment fasteners 114 to couple the upper and lower pieces to together and permit adjustment of the pieces relative to each other.

Figure 8:
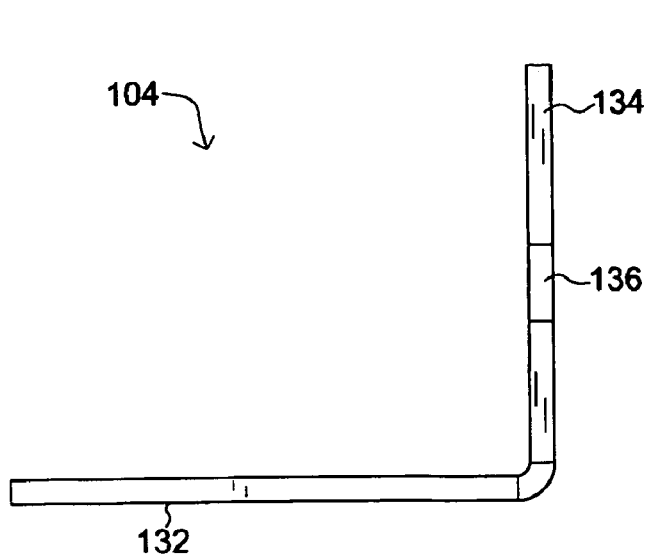
FIG. 8 is end view of the lower long rail of FIG. 6 according to one embodiment of the present invention.

Referring primarily to FIGS. 6-8, the lower long rail 104 typically comprises a stainless steel elongated L-shaped piece of stainless steel plate having a generally horizontally-extending leg 132 and an intersecting vertically-extending leg 134. In one variation, the width of the horizontally-extending leg is about 0.8" wide and the vertically-extending leg has a height of about 0.65". Most notable on the horizontally-extending leg are the plurality of spaced slotted bolt holes 128, also referred to herein as keyhole-shaped openings. The openings are operatively aligned with the threaded bosses 120 that extended along the front and back portions of the base unit flange 122. The larger portion of each bolt hole is slightly greater in diameter than the diameter of the 0.25" hex bolts' heads 112; whereas the slotted portion is smaller in width than the diameter of the head but slightly wider than the fasteners' shafts. Accordingly, the entire lower long rail 104, typically with the upper long rail 106 secured thereto, can be slid over the plurality of heads of the hex head fasteners, which were previously secured into the base unit through the membrane, and then slid rightwardly to lock the rail in place at which point the bolts can be tightened to secure the rail assembly and tightly sandwich the membrane.

Advantageously, the use of slotted bolt holes 128 makes the installation of the rail assemblies significantly easier and less time consuming. As can be appreciated, first cutting holes in a membrane directly above the base unit's threaded bosses 126, placing a plate with standard sized round bolt holes, such as an alternative lower leg of a lower long rail, over the various membrane holes and finally trying to threaded each and everyone of the plurality of bolts through the bolt holes and openings to engage and tighten the bolts in place might prove to be frustrating. It is likely that one or more membrane holes could become misaligned relative to the threaded boss and the associated bolt hole in the plate such as to make threading the bolt impossible and since the membrane is sandwiched between the base unit and the plate making adjustment of the membrane more difficult. In contrast, by using slotted bolt holes the installer only has to be concerned with aligning the membrane with the respective bosses when installing the bolts. Where some misalignment between the membrane and the base unit bosses occur, the membrane is exposed and more easily manipulated by the installer.

Referring to FIGS. 6&7, several significant features are provided on the vertically-extending leg 134. First, open ended elongated slots 136 extend horizontally inwardly from the respective left and right edges of the leg. In one variation, the slots are about two inches long and about an eighth of an inch wide. As is described later, the slots receive tabs on the short rail assemblies to help hold the short rail assemblies in proper alignment with the long rail assemblies.

Also provided on the vertically-extending leg are a pair of vertically extending slots 130 that in one variation are about 0.40" in length and 0.125" wide. These slots interface with a pair of holes 142 on the upper long rail to receive cap screw adjustment fasteners 114 therethrough and permit the vertical adjustment of the upper rails 106 to account for different thickness of the adjacent tile floor helping ensure that the drain's grate is effectively level with the top surface of the floor. One variation permits about 0.25" of vertical adjustment but variations permitting additional adjustment are also possible.

Several weep holes 138 are located on the vertically-extending leg 134 proximate the intersection with the horizontally-extending leg 132. The purpose of the weep holes is to permit water that penetrates between the edge of the floor tile butting up against the long rail assembly and the outside surface of the long rail assembly to drain into the trough 124 rather than be trapped where it can built up and potentially cause damage or facilitate conditions for the growth of mold or other microorganisms. While three weep holes are illustrated more or fewer can be specified in variations. Further, additional weep holes can be incorporated in the short rail assemblies as well.

Figure 10:
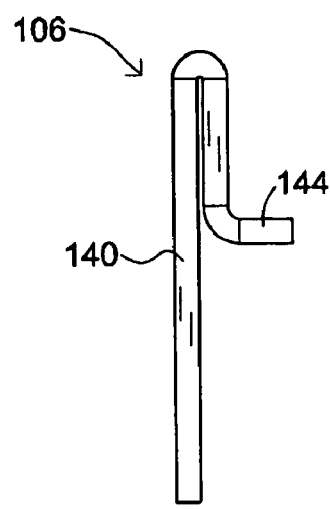
FIG. 10 is an end view of the upper long rail of FIG. 9 according to one embodiment of the present invention.
Figure 9:
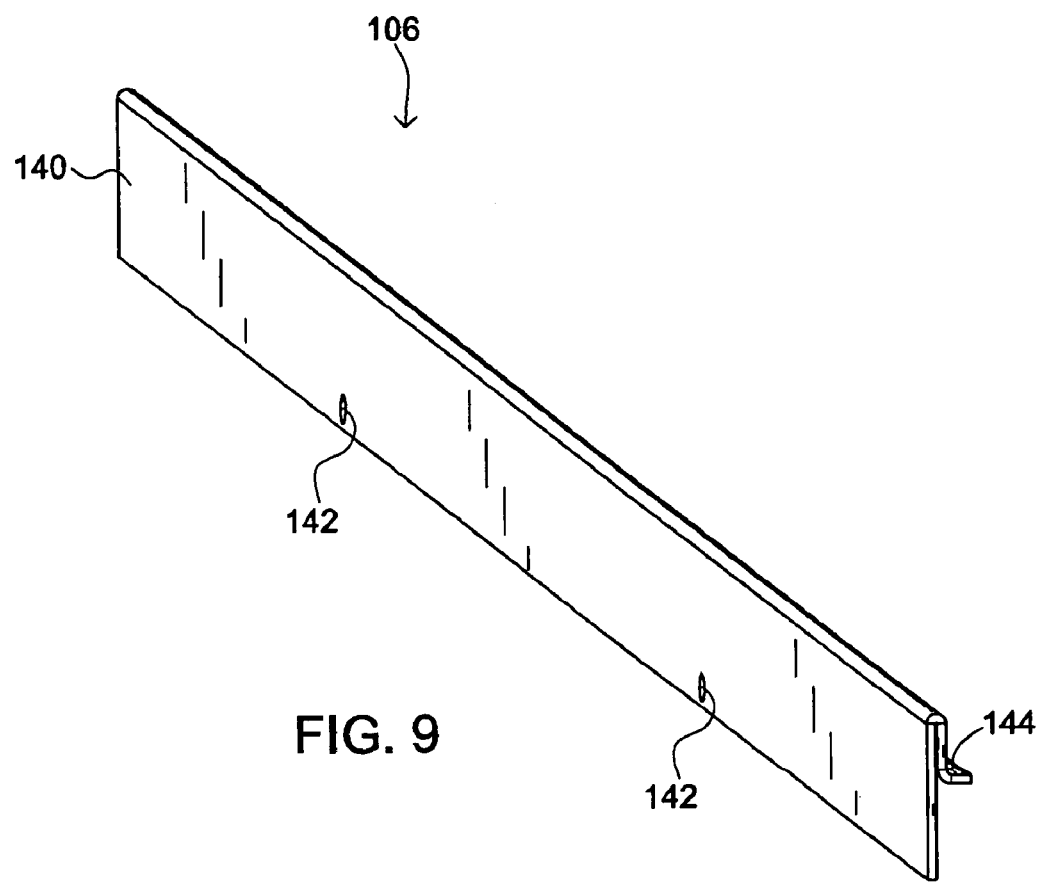
FIG. 9 is an isometric view of the upper long rail according to one embodiment of the present invention.

Referring to FIGS. 9 & 10, an upper long rail 106 is illustrated. The upper long rail is also typically comprised of stainless steel plate that is formed through bending operations. In at least one variation the height of the upper long rail is about 0.70". Of specific note, the upper long rail includes the aforementioned pair of holes 142 located generally proximate a bottom edge thereof that interface and align with the slots 130 in the lower long rail. Typically, the holes are either threaded or small threaded inserts are affixed to the holes to threadably receive small stainless steel cap screws 114 therein.

Specifically to attach the upper long rail 106 to the lower long rail 104 with reference to FIG. 2, an inside surface of the upper long rail is placed against an outside surface of the lower long rail. The respective upper long rails holes 142 and lower long rail slots 130 are aligned and small cap screws 114 are placed first through the slots from the inside surface of the lower long rail and secured to the threaded holes of the upper long rails. When the cap screws are loose the height of the long rail assemblies can be adjusted by moving the upper long rail upwardly or downwardly. By tightening the screws the height of the long rail assemblies can be fixed. It is appreciated that by using a small hex head wrench, the user can adjust the height of the respective long rail assemblies after the assemblies are secured to the base unit 102.

Referring primarily to FIG. 10, at the top edge of the upper long rail 106 the stainless plate is bent 180 degrees over onto itself. Further, a 90 degree second bend is made to the sheet to form a horizontal ledge 144. In one variation the ledge is located approximately 0.30" below the top edge and is about 0.10" wide. The front and back opposing and facing ledges receive the legs of the C-shaped grate 160 thereon with the abutting vertical sidewall acting to prevent the grate from sliding widthwise off of the drain.

Typically, the length of the upper and lower long rails are slightly shorter than the length of the corresponding base unit 102. For instance in the variation wherein the base unit is about 39.4 inches long, the long rails are about 37.8" long. When the base unit is trimmed on the ends to fit along walls small than the drain assembly's length, the long rails are also trimmed. The length of the elongated slots at either end of the lower long rails are sufficient in length that even if trimmed the maximum amount for a particular base unit, enough length of the slot will remain to receive the tabs of the lower short rail 108 therein upon assembly.

Referring primarily to FIG. 2, the left and right short rail assemblies each comprise in combination a lower short rail 108, an upper short rail 110 and an associated socket head adjustment fastener 114 to couple the upper and lower pieces to together and permit adjustment of the pieces relative to each other. The length of the short rail assembly is essentially the same as the inside distance between opposing front and back long rail assemblies when they are installed on the base unit 102. Accordingly, the left and right short rail assemblies typically fit snuggly between and perpendicular to the long rail assemblies at their respective ends to create the rectangular form over which the grate 160 is received. In one variation the approximate width between the insides of the long rail assemblies is about 1.75". It is appreciated that in some variations that the width of the trough 124 is slightly greater than the span between the front and back long rail assemblies and as such the long rail assemblies overhang the respective edges of the trough a small amount. In contrast, the short rail assemblies are typically setback at least a small amount from the left and right edges of the trough and as such do not overhang the trough. For instance, wherein the outermost bosses 118 of the three aligned bosses are utilized to secure the short rail assemblies to the base unit, the inside surfaces of the short rail assemblies are setback from the edge of the trough a significant distance.

The lower short rail 108 is illustrated in FIGS. 11 & 12. Like the lower long rail, the short rail comprises a horizontally-extending leg 150 and a vertically-extending leg 152. Also like the long rail, the short rail is typically fabricated from stainless steel sheet. The width of the horizontally-extending leg in one variation is about 0.50" while the height of the vertically-extending leg is about 0.70".

The horizontally-extending leg 150 includes an open ended slot 146 located proximate the leg's lengthwise center. Through this slot a hex head bolt 112 is received to couple the lower short rail to the base unit by way of a chosen threaded boss 118. Like the lower long rail, the lower short rail 108 when installed tightly sandwiches the water proof membrane against the base unit flange 122 to effectively seal it.

The vertically-extending leg 152 includes an elongated vertically-extending slot 148 that interfaces with a hole 156 on the upper short rail 110 to receive a cap screw adjustment fastener 114 therethrough and permit the vertical adjustment of the upper short rail to account for different thickness of the adjacent tile floor to help ensure the drain grate 160 is effectively level with the top surface of the floor. One variation permits about 0.25" of vertical adjustment but variations permitting other amounts of adjustment are also possible.

Along each of the right and left vertical edges of the vertically-extending leg 152, a tab 154 extends outwardly a short distance. (in one variation about 0.40") therefrom. The tabs are received into the corresponding end slots 136 in the vertically-extending leg 134 of the lower long rail 102. The tabs and slots in combination act to align and hold the short rail assemblies in their proper positions relative to the long rail assemblies.

Figure 15:
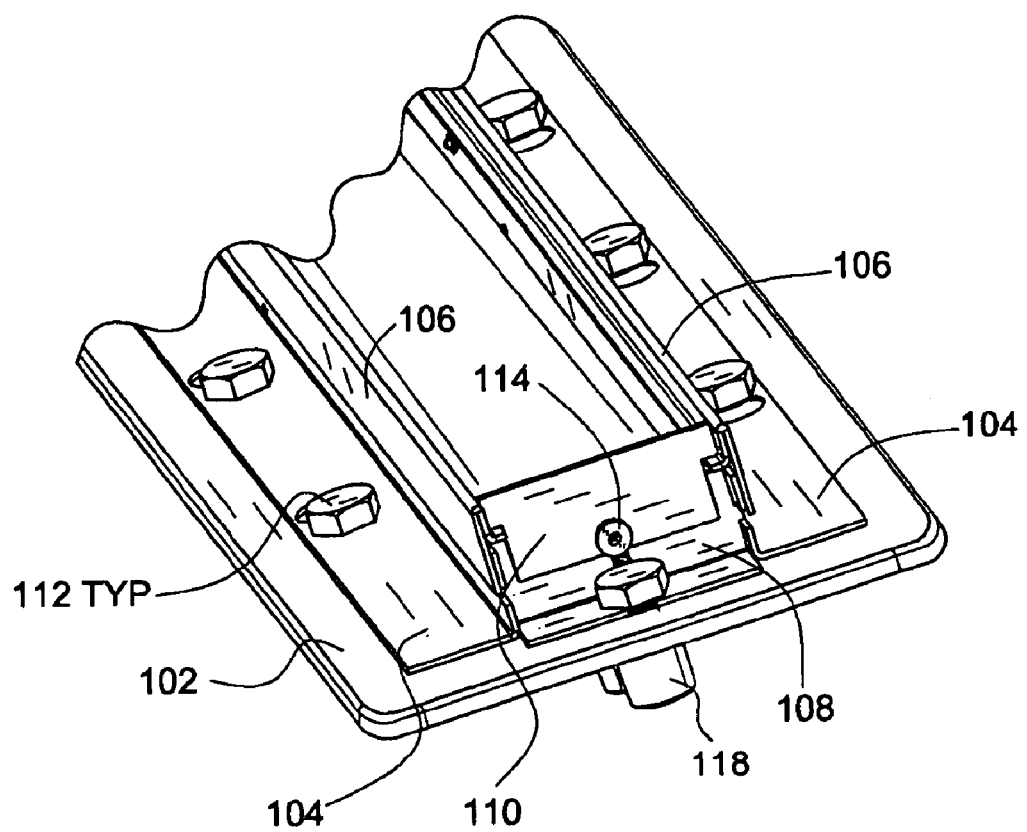
FIG. 15 is first partial isometric view of the assembly of FIG. 2 primarily illustrating the interconnection between the short rails with both the long rails and the drain base unit according to an embodiment of the present invention.
Figure 16:
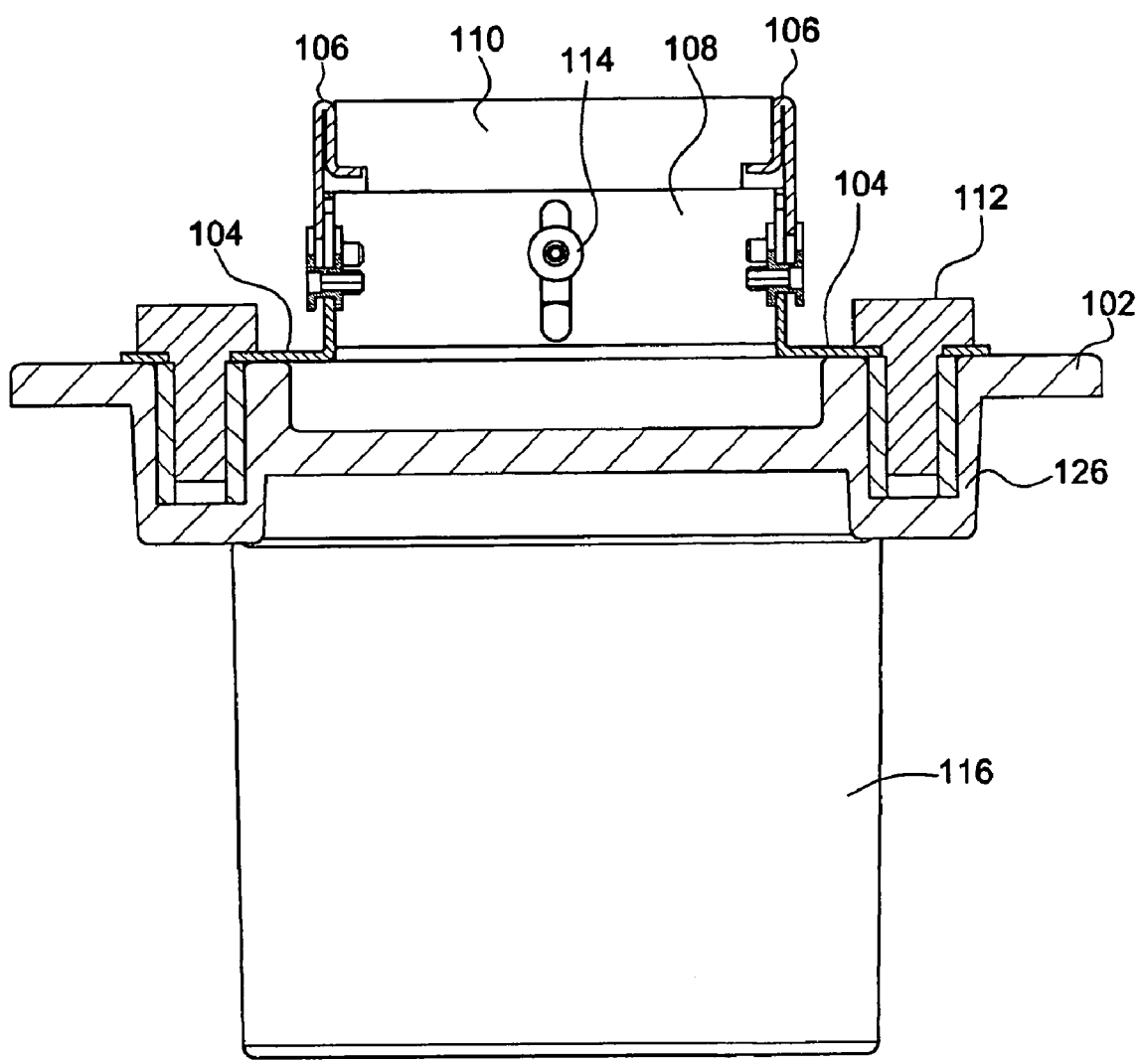
FIG. 16 is a cross sectional end view taken along lines 16-16 of FIG. 2 primarily illustrating the interconnection of the lower long rail with the drain base and the upper long rail.

The upper short rail 110 is illustrated in FIG. 13 and comprises a similar stainless steel plate as the other rail pieces. It is flat and generally rectangular in shape except that an upper portion of the rail is wider than a lower portion thereby giving the piece a T-shape and creating left and right overhangs 158. As can be best seen in FIG. 16, the overhangs rest on the corresponding ledges 144 formed in the upper long rails. As can be seen in FIG. 15, 16 & 17, the top edge of the upper short rail in the illustrated embodiment is located approximately level with the top edge of the upper long rail; however, this can vary in variations depending in part on the configuration of the grate and how it is configured to interface with the remainder of the drain assembly.

Also of significance, the upper short rail 110 includes a hole 156 located generally proximate a bottom edge thereof that interfaces and aligns with the slot 148 in the lower short rail. Typically, the hole is either threaded or a small threaded insert is affixed to the hole to threadably receive a small stainless steel cap screw 114 therein. As with the similar features on the long rail assemblies, loosening the cap screw permits the installer to raise or lower the overall height of the short rail assembly as is necessary depending on the height build of expected for the adjacent tile shower floor.

Prior to installing a front and back lower long rails 108 to the base unit 102 as described above, the long rail assemblies are assembled by at least loosely securing the upper long rail 106 to the lower long rails 104 using the stainless steel cap screws 114. The expected necessary height of the assemblies can be calculated prior to installing the assemblies to the base unit wherein the height of the assemblies may be set by tightening the cap screws prior to installation on the base unit. Alternatively, an installer can decide to keep the cap screws loose with the intent of adjusting the height and tightening the cap screws once the rail assemblies are installed. By doing the later, the installer can potentially dry stack the tile and spacers representing the mortar to more accurately determine the actual stack height of the floor proximate the drain assembly.

Also prior to attaching the short rail assemblies to the base unit 102, the lower and upper short rails 108 & 110 are loosely joined together. Typically, the long rail assemblies are installed to the base unit 102 first and firmly secured in place. Next, the short rail assemblies are installed by sliding the lower rail tabs 154 into the corresponding slots of the lower long rails 136. The overhangs 158 of the upper short rails are rested on the corresponding ledges 144 of the upper long rails and as such the height of the short rail assemblies conforms to height of the long rail assemblies. Presumably, the hex head bolt 112 for each end has been partially threaded into a corresponding boss in the base unit in a manner similar to that described above for the installation of the long rail assemblies. The horizontally-extending arm 150 of the lower short rail is then slid under the head of the bolt such that the bolt's shaft is received in the open ended slot 146. The longitudinal position of the short rail assemblies are adjusted as necessary and the respective hex head bolts 112 are tightened in place. Finally, once the heights of the long rails are set, the cap screws 114 of the short rail assemblies are tightened to fix the height of the short rail assemblies as well.

Although not necessary, an installer may choose to seal the intersections of the short rail assemblies with the long rail assemblies with a bead of a suitable chalking material to further contain water within the drain. Alternatively, the installer may decide that any gaps in the intersections or any exposed portions of the lower long rail slots are available to act as additional weep paths to clear water that has seeped below the surface of the tile floor and the edges of the elongated drain.

The foregoing describes one manner of assembling and installing the first embodiment shower drain assembly; however, other methodologies and variations on the described methodology are contemplated as would be obvious to one of ordinary skill in the art having the benefit of this disclosure.

Figure 14:
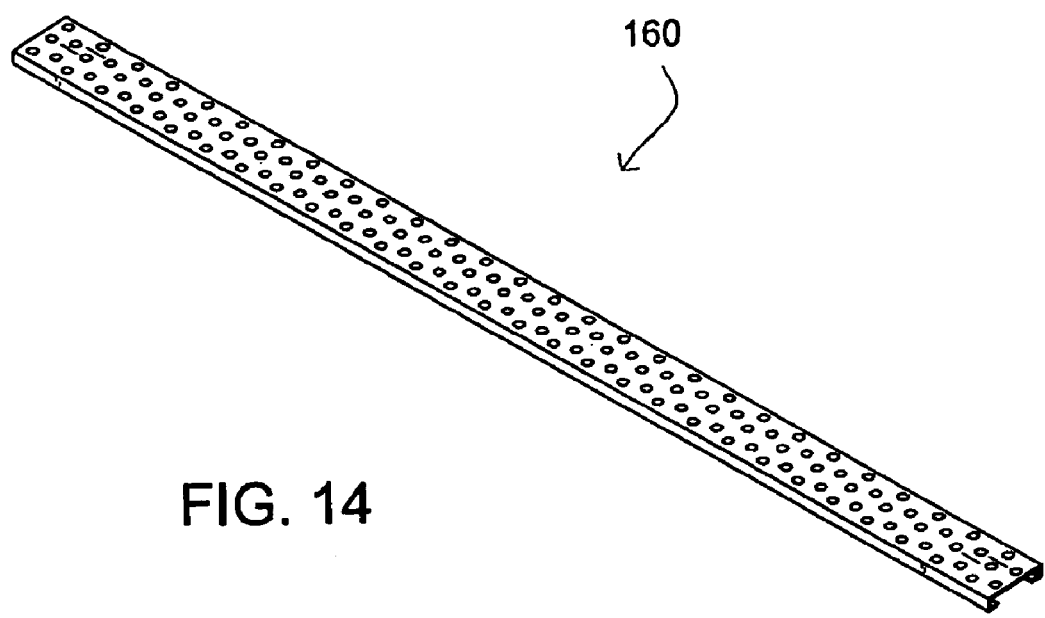
FIG. 14 is an isometric view of the C-shaped grate an isometric view of the lower short rail according to one embodiment of the present invention.

A typical grate 160 that is utilized to cover the rest of the elongated drain assembly is illustrated in FIG. 14. The grate can be made of stainless steel, aluminum or even reinforced or unreinforced plastics. As illustrated, it is generally C-shaped with narrow horizontally disposed lips at the bottom end thereof. As seen in FIG. 17, the bottom surfaces of the lips rest on the ledges of the upper long rails, which support the grate in place.

The length of a grate provided with the described embodiment is at least the same as the maximum length of the rectangular drain form that can be configured using the rail assemblies. If the drain assembly is shortened for use in small shower stalls, the grate can be cut to length as necessary as well. It is to be appreciated that a similar grate structure is used in the second embodiment elongated drain assembly described below.

A Second Embodiment Elongated Shower Drain Assembly

Figure 18:
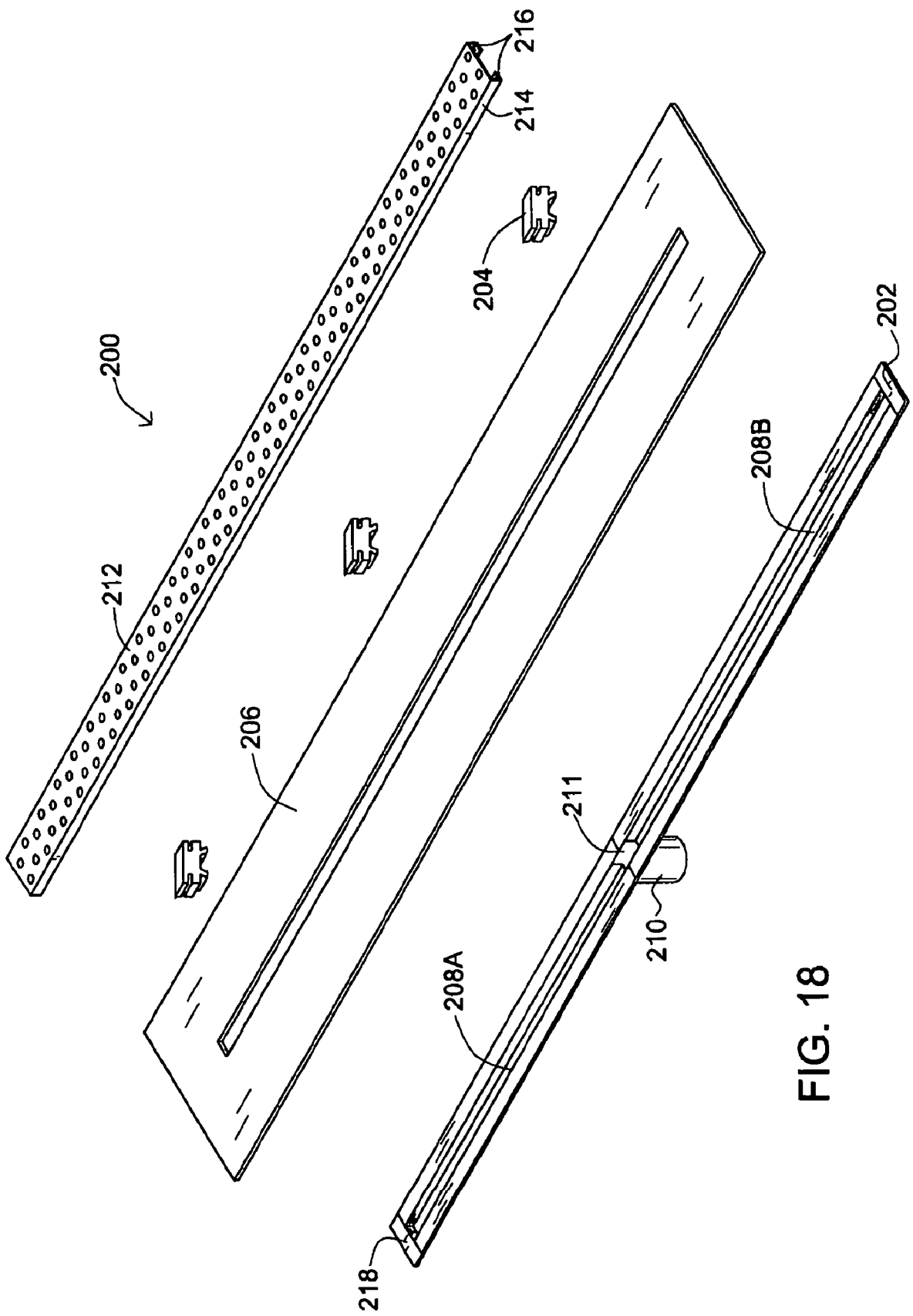
FIG. 18 is an exploded view of an elongated drain assembly according to another embodiment of the present invention.
Figure 19:
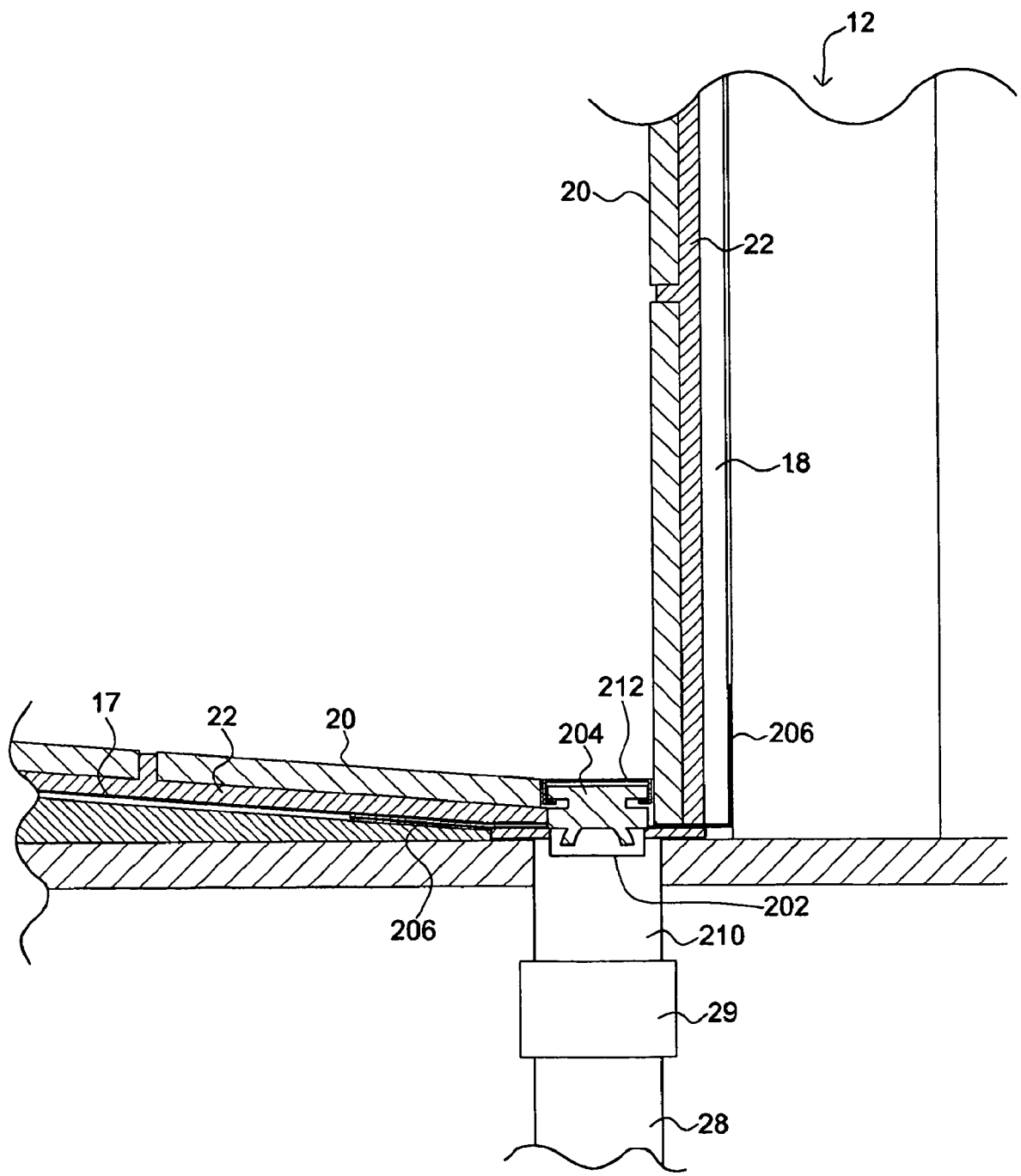
FIG. 19 is a cross sectional view of the elongated drain assembly installed in a shower stall according to the other embodiment of the present invention.
Figure 20:
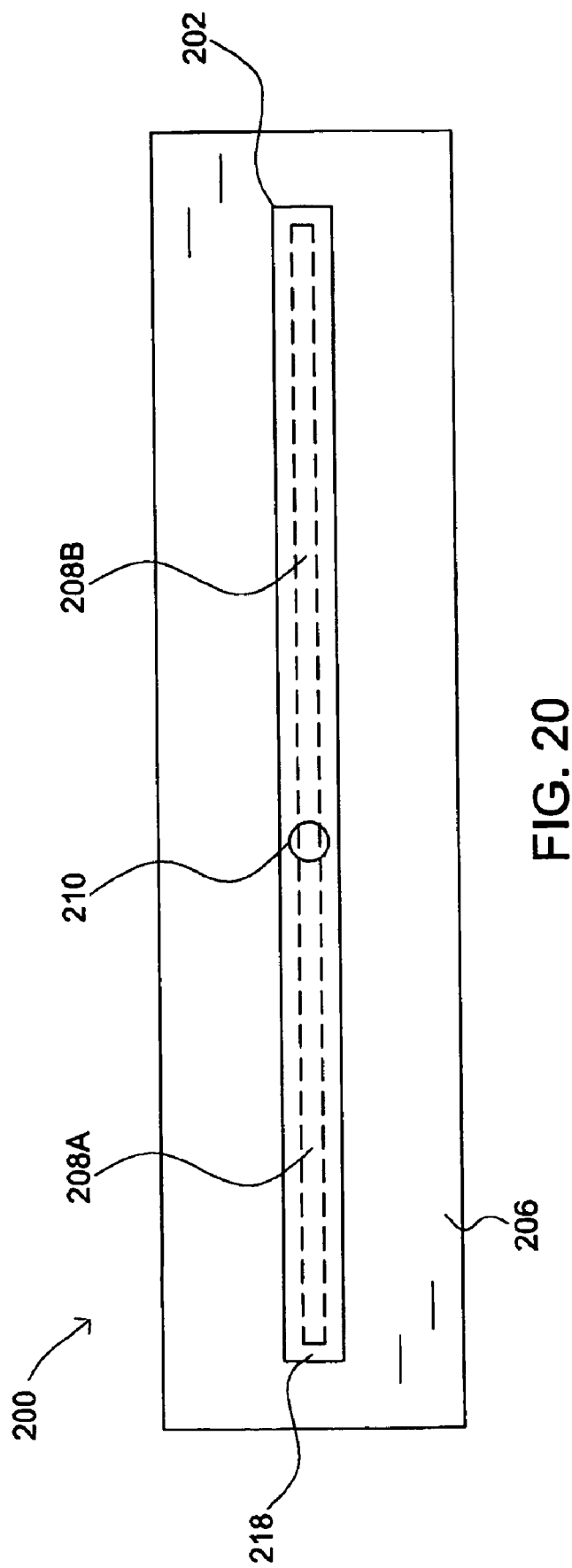
FIG. 20 is a bottom view of the drain base with a waterproof membrane flange secured thereto according to the other embodiment of the present invention.
Figure 21:
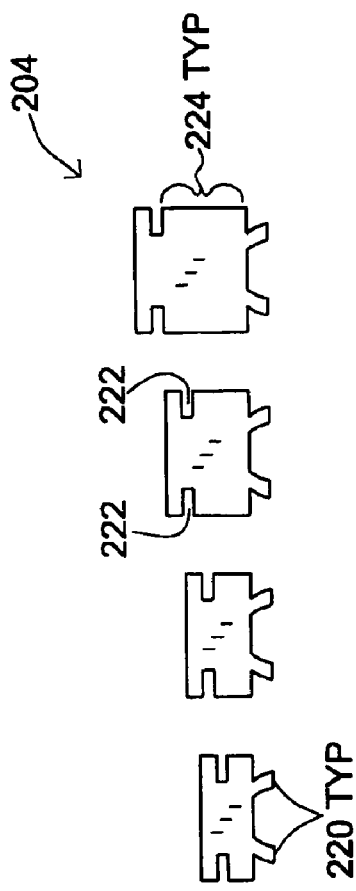
FIG. 21 is side view of several drain grate spacers of differing heights according to the other embodiment of the present invention.

A second embodiment elongated shower drain assembly 200 is illustrated in FIGS. 18 & 19 with some of the various individual components of the assembly being illustrated in FIGS. 20 & 21. The second embodiment assembly essentially comprises: (i) a base unit 202 that rests on the shower stall subfloor and couples with a drain pipe; (ii) a flange 206 made from a waterproof membrane; (iii) a grate 212; and (iv) a plurality of grate spacers 204 to couple the grate with the base unit.

Since in at least one variation the outside diameter of the drain pipe connector 210 is typically smaller or the same size as a typical 2" drain pipe, a coupler 29 is utilized to join the drain to the drain pipe. In some variations as shown in FIG. 19, the coupler is straight facilitating the attachment of the drain pipe 28 to the bottom of the drain. In other variations, a 90 degree elbow connector (not shown) is provided that permits the drain to be coupled with side entry drain pipes.

One embodiment of the base unit 202 as shown in FIG. 18 is comprised of stainless steel although other variations can be fabricated from any suitable material including but not limited to PVC and ABS plastics. The stainless steel variation is typically fabricated from sheet stock that is cut and bent to shape and welded, soldered or adhesively joined and sealed at the various intersections of the formed plate. Alternatively, the base unit can be formed using other known fabrication techniques or combinations of techniques. As can be appreciated ABS and PVC variations of the base unit are typically unitarily molded.

The base unit 202 forms a trough 208 that comprises left and right portions 208A & 208B that slope gently towards a drain pipe connector 210 located generally proximate but center of the unit although the location in variations can vary substantially so long as the respective left and right portions are suitably sloped towards the connector. The width of the trough can vary significantly but in one variation it is about 1.0" making an installed drain less visually obtrusive.

As can be ascertained from the Figures, the inside diameter of the pipe connector 210 in the illustrated embodiment is typically greater than the width of the trough 208. The pipe connector where it interfaces and is connected to the trough overlaps the sides of the trough. An opening 209 is formed through the trough's bottom surface and includes portions 211 that extend up the opposing side surfaces to permit a greater flow of waste water into the pipe connector.

A flange 218 extends around the perimeter of the trough and is about 1.0" wide. The flange typically rests upon the surface of the shower subfloor 24 when the drain 100 is installed and provides physical support for the drain when installed. The drain is typically attached to the shower stall subfloor at the flange either through the use of fasteners, such as screws, or adhesive bonding. Further, the top surface of a flange provides a bonding surface for securing the extended waterproof membrane flange 206 to the base unit 202.

The membrane flange 206 is also best illustrated in FIG. 18. The rectangular membrane can comprise any suitable waterproof sheet material of the type commonly used in shower stall installations; however, a membrane that has an upwardly facing surface adapted to bond to thin set mortar, such as NobleSeal TS, is preferred in circumstances wherein no inner pan is to be used. The center of the flange comprises a rectangular opening corresponding to the size of the trough opening. Typically two parallel beads of adhesive sealant, such as Noblebond EXT, are applied to the flange of the base unit set back from the edge thereof about 0.25"-0.50" and the membrane flange is pressed into the sealant to affix it in place.

To install the drain in a shower stall having a plywood, OSB or other wood subfloor 24, the length of the floor proximate the desired installation location is measured. A second embodiment drain assembly 100 is selected whose length is less than but at preferably close to the measured length. Unlike the first embodiment, the second embodiment is not length adjustable and as such the proper length assembly must be selected prior to installation. Accordingly in some installations, it may be necessary to slope short distances of floor tiles 20 and/or portions of the shower pan located at either end of the drain towards the drain slightly.

Next, optionally using a template provided with the drain assembly, an elongated opening is cut to receive the drain therein. This differs from the first embodiment drain in that the trough 208 is located substantially below the surface of the subfloor. As an example, for the variation of the drain base unit 202 having a 1.0" wide trough and a 3.0" wide width from the opposing longitudinal edges of the base unit flange 218, an about 1.75" wide opening will be cut at a length 1-2" less than the length of the base unit. As can be appreciated, additional material may need to be cut out of the floor proximate the location of the pipe connector 210 to accommodate its large diameter. Furthermore, if a side discharge coupler is being utilized an additional cutout may be required to permit proper attachment of the drain assembly to the drain pipe 28.

The drain base unit 202 with the membrane flange 206 attached thereto is then placed within the opening and the unit's pipe connector 210 is secured to the household drain pipe 28 typically using an appropriate coupler 29. With the membrane flange 206 rolled or folded inwardly to expose the edges of the base unit flange 218, the base unit is fastened in place by driving screws or other suitable fasteners through the exposed portion of the flange and into the overlapping portions of the subfloor 24.

Next, the shower stall floor is sloped towards the drain, typically about 2%. This can be accomplished using a dry pack that is extended up to an edge of the base unit or since the slope is simple proceeding in a single direction, appropriately tapered plywood, OSB or backer board sheet(s) can be laid down and secured in place. In one variation, a sloped sheet 32 of high density foam is utilized. The foam can be bought in a pre-sloped form and is cut as necessary to match the dimensions of the shower stall. If tapered sheet stock is utilized it is typically adhesively and/or mechanically fastened to the underlying subfloor.

The membrane flange 206 is then unrolled and secured to the sloped floor using a thin-set mortar or other suitable adhesive, such as NobleBond EXT. Since one longitudinal side and both end sides abut the walls 12 of the shower stall, the membrane is secured to the framing typically using staples or nails. Using procedures known well known in the industry for shower pan membranes, the membrane flange is folded as necessary to secure and fasten it into the corner wall intersections of the stall. Typically, it is advisable to mechanically fasten the membrane flange to the wall at a distance of at least 2" above the surface of the floor.

Thin-set mortar or other suitable adhesive is applied to the entirety of the sloped floor including the portion of the membrane flange that has been secured to the floor but leaving the membrane flange thin-set free about 1" from the edge of the trough opening. Along this 1" edge two parallel beads of an appropriate flexible sealant are applied. An appropriate membrane 17, such as NobleSeal TS, is placed over the sloped floor and secured in place by pressing it into the mortar and the beads of sealant. The edges of the membrane are then secured to the wall studs using well known practices. Finally, tiles 20 can be set in place directly over the membrane using a thin-set mortar 22. Further, as applicable, the walls 12 of the stall are also tiled typically over drywall or backer board 18 that has been previously secured to the wall studs The drain grate 212, also best shown in FIG. 18 is substantially similar to the grate described above with reference to the first embodiment. In addition to a perforated top surface, it includes to generally vertically orientated downwardly extending sides that each intersect with an in-turned generally horizontal lip. In the embodiment comprising the 1" wide trough, the grate is about 2" wide with a length that is as long or slightly longer than that of the trough 208.

The grate is secured to the base unit by way of a plurality of spacers 204 as illustrated in FIGS. 18, 19 and 21. The spacers each includes a pair of opposing biasing legs 220 that are spaced about 1.1" apart from the outside bottom edge to outside bottom edge and spaced apart just under 1.0" at the leg's upper edges wherein it intersects with the spacers body. The body of each spacer is generally rectangular in shape with two opposing open end slots 222 extending inwardly from opposing vertically orientated sides. The slots are spaced from the bottom side of the body where it intersects with the tops of the biasing legs a predetermined height 224. Spacers are typically available in a number of different heights to account for different overall thickness of tiled shower floors as is described in greater detail below.

FIG. 19 is a cross sectional view of the second embodiment drain 200 assembled and installed in a shower floor. As can be seen the opposing slots 222, or grate attachment, of the spacers 204 receive the lips of the grate 216 therein to support and hold the grate in its finished configuration. Typically, three or more spacers are slid on to the grate from its ends and spaced along the grate to provide the necessary support. The legs 220, or trough attachment, of the spacers are then snapped into the trough 208 of the base unit to secure the grate in place with the bottom side of the spacer body resting against the membrane flange which sits flush against the base unit's flange 218. The particular spacers are chosen from those having a variety of different predetermined heights 224 to result in a grate that when installed has a top surface that is close to flush with the surrounding tile 20.

Of note, the waste water from the shower will enter the drain from both the top of the grate 212 as well as its sides. Since there is no drain body or sidewalls that are seated tightly against the surrounding edges of the tile 20 and mortar 22, there is no need for weep holes or other mechanisms to prevent the build up of water within the surrounding tiles. The extended membrane flange 206 in combination with the shower floor membrane 17 effectively ensures that water will not in the region surrounding the drain into or on the subfloor 24.

Alternative Embodiments and Variations

The various preferred embodiments and variations thereof illustrated in the accompanying figures and/or described above are merely exemplary and are not meant to limit the scope of the invention. It is to be appreciated that numerous variations to the invention have been contemplated as would be obvious to one of ordinary skill in the art with the benefit of this disclosure. All variations of the invention that read upon the appended claims are intended and contemplated to be within the scope of the invention.

The installation of the elongated drain assembly embodiments are described above for plywood or OSD type subfloors. It is appreciated, however, that the drain assemblies can be used with concrete floors as well with suitable modification of the above described processes. For instance, for poured concrete installations, the second embodiment drain is coupled to the drain pipe and supported in place with an appropriate form. The concrete is then poured around the drain securing it in place. The membrane flange is then unfolded and affixed to the concrete floor and the subsequently laid waterproof membrane in a manner similar to that described above.

I claim:

1. A liquid discharge drain comprising:
  a one piece base unit including (a) an elongated trough having a trough length at least seven times a trough width, the trough including a bottom side and a discharge opening located generally proximate a longitudinal middle of the trough, the bottom side including a left portion sloping downwardly towards the discharge opening and a right portion sloping downwardly towards the discharge opening and (b) a flange extending around the perimeter of the trough;
  an elongated grate having a top surface;
  front and back longitudinally-extending sidewall assemblies, each sidewall assembly including (i) a longitudinally-extending lower rail being L-shaped with horizontal and vertical legs, the horizontal leg adapted to couple with the flange, and (ii) a longitudinally extending upper rail wherein the longitudinally-extending upper rail is vertically adjustable relative to the vertical leg of the longitudinally-extending lower rail; and a means for selectively adjusting spacing between the grate top surface and the trough to one of at least a plurality of different spacings.

2. The drain of claim 1, wherein the means for selectively adjusting spacing comprises at least a first and a second set of spacers, each spacer in the first set having a first dimension between a trough attachment and a grate attachment, each spacer in the second set having a second dimension between a trough attachment and a grate attachment, the first and second dimensions being different.

3. The drain of claim 1, wherein the means for selectively adjusting spacing comprises two or more vertically-orientated slots located on one of the longitudinally-extending lower and upper rails and two or more fastener holes located on the other of the lower and upper longitudinally-extending rails, the fastener holes being aligned with the slots, each sidewall assembly further including the same number of height adjustment fasteners as there are slots, each fastener being received through a slot and a corresponding fastener hole.

4. The drain of claim 3, further comprising left and right laterally-extending sidewall assemblies, each laterally-extending sidewall assembly including a laterally-extending lower rail and a laterally-extending upper rail, the laterally-extending upper rail being vertically fixedly adjustable relative to the laterally-extending lower rail.

5. The drain of claim 4, wherein one of the laterally-extending lower and upper rails comprises two or more vertically-orientated slots and the other of the lower and upper laterally-extending rails comprises two or more fastener holes, the fastener holes being aligned with the slots, each sidewall assembly further the same number of adjustment fasteners as there are slots, each adjustment fastener being received through a slot and a corresponding fastener hole.

6. The drain of claim 4, wherein the flange includes a set of two or more threaded bosses on each of the left and right ends of the base unit, each threaded boss of each set of two or more threaded bosses being longitudinally aligned substantially along a longitudinal axis of the base unit.

7. The drain of claim 3, wherein the grate includes opposing front and rear longitudinally-extending lips and the front and rear longitudinally-extending upper rail assemblies each include longitudinally-extending ledges, the left and right longitudinally-extending lips resting on and being supported by the corresponding longitudinally-extending ledges when the drain is assembled.

8. The drain of claim 2, wherein (i) the grate attachment comprises a pair of opposing substantially vertically-aligned horizontal open end slots, (ii) the trough attachment comprises a pair of opposing biasing members, the biasing members adapted to snapably secure the spacer in the trough, and (iii) the grate further including a pair of facing and opposing horizontally-orientated lips, the lips adapted for slidable receipt into the vertically-aligned horizontal open end slots of the spacer to inhibit vertical movement of the grate relative to the spacer.

9. The drain of claim 1 wherein: (i) the flange includes a plurality of threaded bosses disposed therearound; (ii) the horizontal leg having a plurality of openings disposed therearound, the openings corresponding to the threaded bosses when the horizontal leg is coupled to the flange, and (iii) the drain further comprises a plurality of threaded fasteners sized to be received through the openings and in the bosses, the threaded fasteners each having a head and a threaded shaft.

10. The drain of claim 1, wherein the length of the drain is adjustable.

11. A liquid discharge drain comprising:

an elongated trough having a trough length at least seven times a trough width, the trough including a bottom side and a discharge opening located generally proximate a longitudinal middle of the trough, the bottom side including a left portion sloping downwardly towards the discharge opening and a right portion sloping downwardly towards the discharge opening;

an elongated grate having a top surface; and front and rear longitudinally-extending sidewall assemblies, each longitudinally-extending sidewall assembly including a longitudinally-extending lower and a longitudinally-extending upper rail, the longitudinally-extending upper rail being vertically fixedly adjustable relative to the longitudinally-extending lower rail;

wherein (i) the trough is a portion of a one piece base unit, the base unit further including a flange extending around the perimeter of the trough, the flange including a plurality of threaded bosses disposed therearound, and (ii) the drain further comprises a plurality of threaded fasteners sized to be received in the bosses, the threaded fasteners each having a head and a threaded shaft, and (ii) the longitudinally-extending lower rail is substantially L-shaped with a horizontal leg having a plurality of keyhole-shaped openings, the keyhole shaped openings having (a) a first portion having an effective diameter greater than an effective diameter of the head of an associated threaded fastener of the plurality of threaded fasteners, and (b) a second portion having an effective diameter greater than the effective diameter of the threaded shaft of an associated threaded fastener of the plurality of threaded fasteners.

* * * * *